INVENTORS.
Robert G. Heitz
William E. Brown
Charles A. Levine
BY Griswold & Burdick
ATTORNEYS 3,679,480
ELECTRICAL CELL ASSEMBLY
William E. Brown, Walnut Creek, and Robert G. Heitz and Charles A. Levine, Concord, Calif., assignors to The Dow Chemical Company, Midland, Mich.
Continuation-in-part of application Ser. No. 567,587, July 25, 1966. This application May 8, 1969, Ser. No. 823,000
The portion of the term of the patent subsequent to Nov. 4, 1986, has been disclaimed
Int. Cl. H01m 35/00
U.S. Cl. 136—6
8 Claims

ABSTRACT OF THE DISCLOSURE

A cell for generating electrical energy is provided comprising a sealed container partitioned into anode and cathode chambers, said partition comprising an electrolyte-separator. The latter is in the form of a bundle of hollow, fine glass or ceramic fibers sealed within a common header. The fibers are sealed at the end which penetrates the cathode chamber and are in open communication with the anode chamber. Preferred anode and cathode materials comprise an alkali metal such as sodium or potassium and sulfur respectively. The cell is useful as either a primary or secondary battery. By providing for the introduction of alkali metal and the withdrawal of catholyte during operation, it can be readily modified to provide a fuel cell.

THE SPECIFICATION

This application is a continuation-in-part of our co-pending application Ser. No. 567,587, filed July 25, 1966, now U.S. Pat. 3,476,602.

In the above mentioned U.S. patent and in U.S. Pats. 3,404,035 and 3,404,036, a new battery system is described. Basically, it operates with an anode of an alkali metal and a cathode of a material reactive with alkali metal ions. The anode and cathode are separated by an ion conducting, electron insulating electrolyte material, such as glass or ceramic materials.

It is an object of the instant invention to provide a novel battery assembly, which exhibits a power to size ratio and a power to weight ratio far greater than can be realized with conventional primary or secondary battery cells.

A further object is to provide an improved assembly for sodium sulfur batteries in which electrolyte (separator) surface is maximized.

The foregoing and other objects and advantages will become apparent from the following description of the instant invention.

INVENTION SUMMARY

The battery assembly of the instant invention comprises a sealed container, which is divided or positioned into mutually exclusive anode and cathode chambers. Partitioning of the anode and cathode chambers is achieved by means of a solid electrolyte-membrane, sometimes also referred to herein as the electrolyte or separator, in the form of a plurality of hollow fine fibers held together as a bundle by means of a tube sheet or common header. The fibers may be of glass or ceramic materials. They extend into the cathode chamber but are closed thereto. They are in open communication with the anode chamber. For example, single strands of hollow fibers are sealed at the end extending into the cathode chamber and are open to the anode chamber at the other end. Continuous hollow fibers may be looped into the cathode chamber so that both ends communicate with only the anode chamber. The electrolyte (separator) is usualy made of a material such as a polycrystalline ceramic, amorphous glass or an impregnated matrix, the latter having embedded therein an essentially nonmigrating salt or liquid which is permeable only to the anode metal ion. The electrolyte (separator) is further characterized as transmitting ions of the alkali metal anode between the anode and cathode chambers but as being substantially non-conducting to electrons. Within the anode chamber is contained a liquid alkali metal, such as sodium or potassium. The cathode chamber contains a reducible material, such as sulfur, selenium, tellurium, tetracyanoethylene, parathiocyanogen and/or ferricyanide.

DETAILED DESCRIPTION

Figure 1:
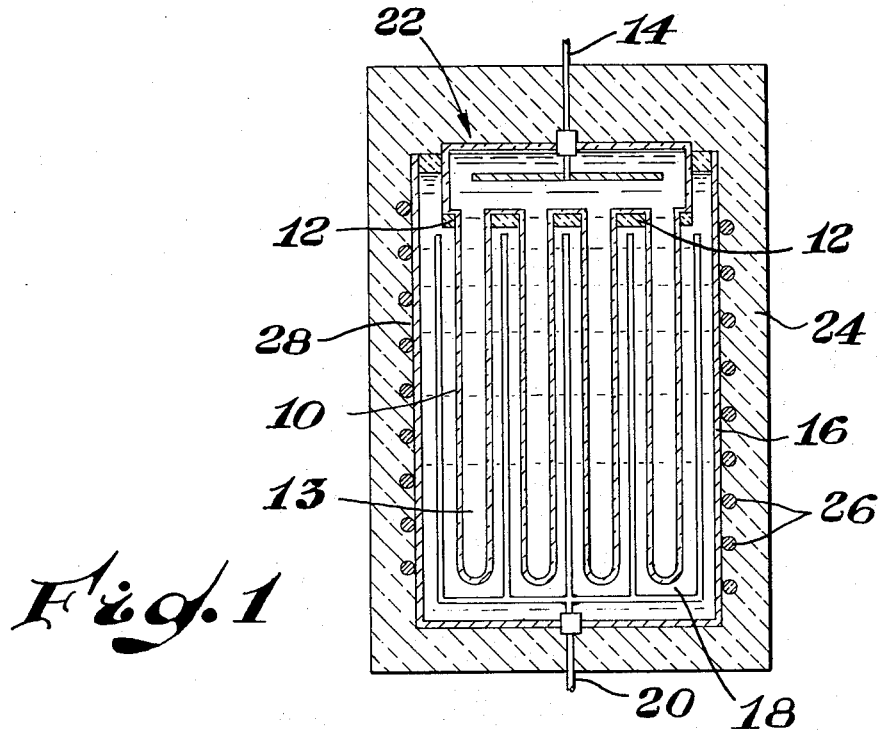
FIG. 1 is a cross-sectional view of one embodiment of the instant invention.

The battery cells can be fabricated as a complete unit comprising the electrolyte (separator) and electrodes in a liquid and vapor tight case. Conveniently the separator can be sealed in a case to provide separate anode and cathode compartments. The outer case or container, or at least the portion thereof comprising the cathode compartment, ordinarily is fabricated from an electron conducting material and is of a structural stability such that it does not degrade or detrimentally react with battery components during operation. Use of an electron conducting material provides for ready connection of cathode lead wires. Also, to assure the optimum of efficiency, the case is covered with a thermal insulating material to minimize heat losses both during cell operation and off-duty storage. Alternatively, a jacket of insulating material having heating wires or other type heating elements adjacent the case can be used to cover part of or the entire battery cell.

A preferred anode-cathode-electrolyte system of the present invention consists of a liquid sodium anode, a liquid sulfur-sodium sulfide mixture as cathode system, e.g. a sodium polysulfide, and a sodium ion conductive glass or ceramic electrolyte. This system is capable of producing energy densities of over 300 watt-hours per pound at operating temperatures as low as 330° C.

The term anode as used herein, in accordance with recognized electrochemical and electrical engineering practices denotes, when the cell is acting as a battery, i.e. delivering current to a load, the electrode at which current enters the cell. The term cathode denotes the electrode at which current leaves the cell.

Any of the alkali metals, i.e. lithium, sodium, potassium, rubidium, cesium, their amalgams, alloys and mixtures can be used as the anode. Sodium, potassium and their binary alloys ordinarily are employed. Sodium, as indicated hereinbefore, preferably is used as the anode in the present novel battery.

Cathode materials used in the present invention are non-aqueous, liquid reducible materials such as the elements sulfur, selenium, tellurim and compounds or anions such as tetracyanoethylene, para-thiocyanogen, ferricyanide and the like. Ordinarily, sulfur, selenium, tellurium and mixtures thereof are employed, sulfur being preferred. For those cathode materials which in the liquid state exhibit a high electrical resistivity, unexpectedly when an alkali metal salt is admixed therewith the requisite conductivity needed for operability when the battery is at or near full charge is provided. Usually to prepare such conductive mixtures, the salt used has a cation the same as that of the metal used for the anode and the anion is the same as that of the cathode material. Sodium sulfide dissolved in, or in admixture with, sulfur has been found to be particularly suitable for use in the practice of the present invention since these two components provide mixtures which become liquid at relatively low temperatures, e.g. at a minimum temperature of from about 270°–330° C. and which also unexpectedly exhibit high electrical conductivity over wide compositional ranges.

With the preferred sulfur-sodium sulfide catholyte system, ordinarily when used in a secondary battery and the battery cell is at full charge, the catholyte mixture of sodium sulfide and sulfur has an empirical formula corresponding to the empirical formula $Na_2S_{22}$. As current is drawn from the cell and additional sodium sulfide is formed in the cathode compartment (by virtue of the sulfur being reduced and from migration of sodium ions) this mixture composition changes. Discharge ordinarily is stopped at or before the point when the mixture corresponds to the empirical formula $Na_2S_3$ to assure operability at relatively moderately elevated temperatures. Even at this high sodium/sulfur ratio, the cathode mixture is liquid at temperatures as low as about 330° C. By stopping discharge at a catholyte composition corresponding to $Na_2S_4$, the minimum cell operating temperature can be reduced to about 285° C. However, if it is desired to operate at higher temperatures, the cell can be discharged to a catholyte composition corresponding to $Na_2S_2$ (liquid at about 560° C.), for example.

The novel liquid sodium metal-sodium polysulfide electrode system provides an exceptionaly high energy density when compared with conventional anode-cathode systems. For example, if a cell having an initial sodium polysulfide composition of $Na_2S_{20}$ is discharged to a sodium sulfide-sulfur mixture corresponding to $Na_2S_3$ the energy density realized is about 306 watt-hours per pound of combined anode and catholyte materials.

The electrical resistance of the antifuel materials themselves for the most part is exceptionally high. Molten sulfur, for example, has a resistivity reported to be in the range of $1 \times 10^{17}$ to $8 \times 10^{15}$ ohm-cm. Unexpectedly, with the disclosed specific liquid catholyte mixtures exceedingly low resistances are obtained. For illustrative purposes, representative conductances, expressed in reciprocal ohm-centimeters (ohm$^{-1}$ cm.$^{-1}$), of a number of liquid sodium sulfide-sulfur mixtures corresponding to various sodium polysulfide ($Na_2S_x$) compositions are presented in Table I which follows:

TABLE I

| Temperature, °C | Specific conductance, ohm$^{-1}$ cm.$^{-1}$ | | | | |
| --- | --- | --- | --- | --- | --- |
| | 280 | 300 | 320 | 340 | 360 |
| Sodium polysulfide composition: | | | | | |
| $Na_2S_4$ | 6.2 | 9.0 | 11.5 | 14.4 | >16 |
| $Na_2S_5$ | 7.1 | 9.6 | 12.0 | 13.8 | 14.6 |
| $Na_2S_8$ | 3.6 | 5.3 | 7.1 | 8.8 | 10.6 |
| $Na_2S_{12}$ | 3.3 | 4.8 | 6.3 | 7.8 | 8.4 |
| $Na_2S_{22}$ | 1.9 | 2.9 | 3.8 | 4.7 | 5.5 |

Electrolytes suitable for use in the battery cell of the present invention are those inorganic and organic polymeric materials which have the ability to keep the liquid anode and cathode materials separated, which are conductive in that they must be able to transmit ions of the anode metal between the anode compartment and the cathode compartment but do not substantially conduct (1) electrons, (2) the elemental metal anode (3) or the cathode material in either its molecular and/or ionic form. Additionally, the electrolyte should not be detrimentally degraded during operation and should be highly resistant to attack by other components of the battery cell. Further, this material should possess properties which will assure many cycles of charging and discharging of the battery cell. Preferably this material has a high ionic conductivity.

Electrolytes which have been found to be particularly suitable for use in the battery cell of the present invention include, for example, polycrystalline ceramics (such as the porcelains and glass ceramics) amorphous glasses and impregnated matrixes (such as porous glass or ceramic frits) in which have been embedded an essentially non-migrating salt or liquid which is substantially permeable only to the anode metal ion.

For optimum efficiency and operating life, ordinarily glass or ceramic electrolytes are fabricated utilizing relatively large proportions of the alkali metal oxide or alkali metal oxide former that is derived from the same alkali metal as that of the anode. With such electrolytes, there is markedly less tendency for strain and rupture in the electrolyte-separator during cell operation than when the prime constituent of the alkali metal oxide in the glass is of a different material and thus of a different ionic size than the alkali metal of the anode. Ordinarily, alkali metal silicate glasses having a conductivity in the range of from about $10^{-3}$ to $10^{-6}$ or higher ohm$^{-1}$ cm.$^{-1}$ at about 250° C. are used as electrolyte. Specific examples of typical operable electrolytes include, for example, alkali metal silicate commercial glasses as well as alkali metal borate, -aluminate, -zirconate and the like glass materials.

As used in the battery cell, the electrolyte can be in the form of thin membranes fabricated in various orientations. These membranes can be in the form of flat plates, corrugated sheets, spirals or other designs which during operation will provide for anode metal ion transfer but will keep separate the liquid anode and cathode materials.

A preferred form for the electrolyte is fine, hollow fibers wherein the individual fibers have an outside diameter/wall thickness ratio of at least 3, ordinarily from about 3 to about 20 and preferably from about 4 to about 10. Usually within these ratios, fibers having an outside diameter from about 20 to about 1000 microns and a wall thickness of from about 5 to about 100 microns are used. Such hollow fibers provide a high strength, thin walled membrane and give a high ion conductivity. They also provide a very large surface area to volume ratio. Although less advantageous in the latter respect, fibers as large as 5000 microns outside diameter and having walls as thick as 1000 microns can be employed when fabricated from more highly ion conductive materials, e.g. certain porcelains.

For use in a battery cell, the hollow fibers can be fabricated into bundles of circular, rectangualar, prismatic or other geometric cross-section shapes which provide for a controlled orientation and substantially uniform spacing between fibers. The actual fabrication of the electrolyte fibers into a predetermined configuration readily can be carried out by one skilled in the art using known handling, packing and fabricating techniques. To illustrate, bundles of the fibers each having one end closed can be prepared wherein the open ends of the fibers are passed through and sealed into a common header which in turn either serves as or communicates with a reservoir for anode metal.

Glass and ceramic hollow fibers or other electrolyte (separators) can be sealed in place as a bundle in a header, for example, by adhesives such as glazing or potting compounds, solder glass, high temperature thermosetting resins and the like materials.

A battery cell of the present invention employing tubular hollow fibers as electrolyte as shown in FIG. 1 illustrates one embodiment of the present invention. In this embodiment, a multiplicity of hollow glass fibers 10 fabricated from a conductive glass within the size range set forth hereinbefore and having their lower ends sealed off are positioned in parallel substantially uniformly spaced apart relationship and sealed into a common header 12. A molten alkali metal 13, for example sodium, substantially fills the hollow fibers and header. An anode lead 14 is positioned in the header 12 contacting the molten anode 13 and the assembly sealed. The anode and electrolyte-separator assembly is placed in a container 16 which serves as a reservoir for the molten cathode 18 (e.g. sulfur having sodium sulfide in admixture therewith). A cathode lead assembly 20 is positioned within the vessel 16 in contact with the molten cathode material 18 and the entire battery assembly sealed with top assembled 22 so as to be vapor and liquid tight.

To assure that both the anode and cathode are maintained in the molten state ordinarily the vessel 16 is jacketed with an insulating cover 24. Alternatively, if desired, this cover 24 in turn can be fitted with an electrical resistance heater 26 adjacent the outer wall 28 of the vessel 16.

Figure 2:
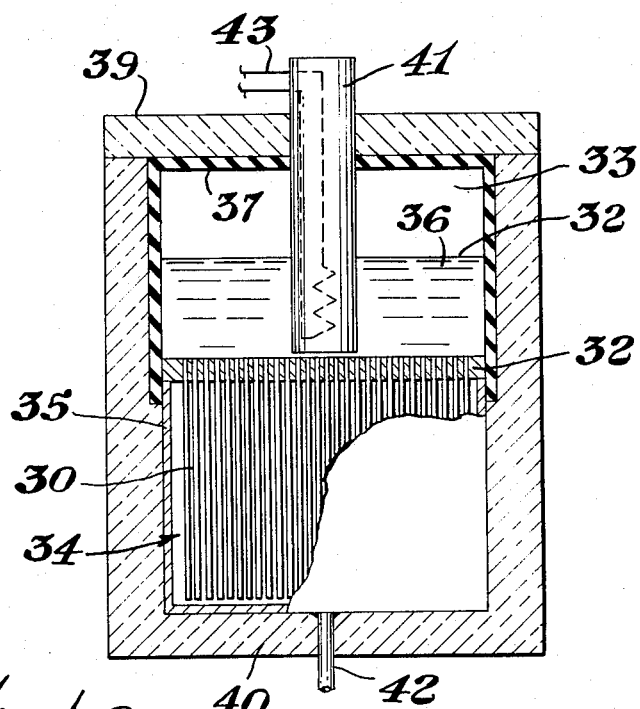
FIG. 2 illustrates a second embodiment of the invention in a cross-sectional side elevation.

In a second embodiment of the battery as shown in FIG. 2, the electrolyte is in the form of a large number of hollow fine glass fibers 30 sealed within a tube sheet 32 prepared from a potassium and sulfur resistant potting resin. The assembled tube bundle is sealed within an electrically insulating anode can 37, of glass, which in turn is sealed to an electrically conductive cathode metal can 35. Thus, is defined an anode compartment 33 containing potassium 36 and a cathode chamber 34 containing potassium sulfide (not shown) in exterior relationship to the fibers 30. Extending through, and sealed within, the glass anode can 37 and penetrating substantially into the anode compartment to contact potassium is a graphite anode lead 41 in which there is embedded an electrical, resistance-heating circuit 43 for melting the potassium. The cathode lead 42 is electrically attached to the cathode can 35. The resulting assembly is placed within a thermal insulator comprising a top 39 and bottom 40 of a thermal insulating material.

It is to be understood that a multiplicity of such units of either of the embodiments illustrated can be assembled in series to give a battery cell capable of delivering a predetermined power output.

In the operation of the battery cell of the present invention, as current is drawn from the battery, the molten alkali metal anode gives up electrons and forms the corresponding metal ions. The electrons go through an external circuit doing work while the resultant alkali metal ions diffuse or otherwise are transported through the thin wall electrolyte and migrate toward the cathode. At the molten cathode, electrons are fed into the cathode chamber through the cathode lead from the external circuit forming anions with the molten cathode material, for example sulfur. These anions are, in effect, neutralized by reaction with the alkali metal ions migrating through the electrolyte thereby forming the alkali metal salt. This reaction continues through the discharge cycle of the battery.

To recharge the battery, a source of current is attached to the leads so as to feed electrons through the anode lead 41 to the molten sodium or potassium anode and the positive lead from the power source is attached to the cathode lead 42 of the battery. As the voltage of the power source is increased over the battery voltage, the exact reverse of the electrode reactions presented for the discharge cycle takes place. Alkali metal ions pass through the separator; alkali metal is regenerated and the reduced cathode material is oxidized to its original state. An unexpected advantage of the present system particularly when utilizing the sodium-sodium sulfide sulfur electrodes is that much more rapid recharging of the battery can be carried out without any adverse effects. In conventional lead-acid storage batteries, permanent damage occurs unless a slow "trickle" charge is applied during the recharge cycle.

Although a preferred embodiment of the present battery is the rechargeable secondary type, the liquid anode-cathode system can be employed in either cells of the primary type or the secondary (rechargeable) type. With primary type cells, using a sulfur-alkali metal catholyte system, for example, at full charge the catholyte ordinarily has a higher sulfur concentration and battery operation is continued until discharged, i.e. until the power output falls off to such an extent that the battery does not put out enough heat to maintain the anode and cathode in the fluid state required for operability. Applications for such a cathode system primarily are in batteries used in situations requiring a low current density and/or at remote, hard to reach installations. The actual cathode composition for such cells is limited only in that the requisite conductance is present in the charged battery. This offers the advantage for such uses of a high power output from a low battery weight. It is to be understood that even in such systems, the battery can be recharged.

Additionally, it is to be understood that if the fuel, e.g. liquid metal, and anti-fuel, e.g. liquid sulfur, are added during battery operation and if the resulting reaction product controllably is removed from the catholyte chamber so as to assure both the maintenance of a high concentration of the liquid anti-fuel and conductivity of the system the battery can be used as a fuel cell. In such operation the addition of the fuel and anti-fuel and removal of the reaction product can be made on a continuous or intermittent basis.

As indicated hereinbefore, operability of the present system is based upon the use of a liquid anode and liquid cathode system. It is entirely unexpected, as set forth hereinbefore, that an alkali metal salt would provide with a non-polar anti-fuel of the type listed hereinbefore an electrically conductive melt which when employed with a liquid metal fuel provides a battery cell of high charge density. However, good conductances are achieved thereby providing for the first time the use of low equivalent weight and economic electrode materials thus providing a marked advance in the battery art.

In a specific embodiment, a 2-volt cell is prepared using liquid sodium as the anode and sodium polysulfide as the liquid cathode. This cell is designed to operate at a temperature of about 300° C. For this cell, about 54,000 ion conductive glass fibers each having an inside diameter of about 48.2 microns and a wall thickness of about 12.05 microns are placed in parallel relationship one to another to provide a center to center fiber spacing of about 192 microns. This occupies a cross-sectional area of about 20 square centimeters. The overall appearance of the parallel shaped fibers is a cylinder. The fibers are held in place by "cementing" with a low melting adhesive glass. The fibers are attached through one open end to a common header of a porcelain insulating flange by means of a low melting glass adhesive. The other end of each of the fibers is cut to a length of 8 inches and sealed off by heating. The so-fabricated cell bundle, designed to provide an effective area of glass in the battery cell of about 61 cm.$^2$/cubic cm. of the cell, can be placed in a metal container which also serves as a cathode reservoir. The internal IR loss (voltage drop) from the glass is about 0.13 volt at 1 ma./cm.$^2$. Lead wires are attached to the anode assembly and to the metal case holding the cathode. The case can be filled under a reduced pressure with a predetermined amount of a liquid sulfur-sodium sulfide mixture to provide a sulfur-sodium sulfide composition corresponding to $Na_2S_{22}$. The volume of the liquid cathode is 0.89 cubic centimeter per cubic centimeter of the cell. The assembly of the glass tubes and insulating flange can be fastened to a header compartment and this assembly filled with liquid sodium also under a reduced pressure. Connections for the lead wires are affixed to the anode and cathode compartments. The container seals for the latter unit are constructed so as to be vapor and liquid tight.

Multiples of these cells can be connected in series to give batteries of predetermined voltage for a variety of uses. To illustrate, 120 of these cells can be connected in a combination of parallel and series arrangement to provide a power source capable of delivering 6 kilowatts for 7 hours at about 60 volts.

In order to assure maintenance of the operating temperature, utilization of 2 inches of glass wool insulation or its equivalent around the cell prevents complete discharge of the battery even if idled for as long as a 24 hour period.

The battery is reversibly rechargeable and shows no degradation after many hundreds of discharge-charge cycles.

In a manner and by apparatus similar to that described in connection with the above specific embodiment, a battery can be prepared using a liquid lithium anode and a liquid sulfur-lithium sulfide cathode system. In this system for optimum in performance, an inert atmosphere, e.g. argon, is utilized above the liquid anode to eliminate any possibility of anode contamination by reaction with the atmosphere.

Rechargeable battery cells of high power/volume densities providing from as high as 40,000 watt-hours or more can readily be fabricated in accordance with the invention. These can be in the form of cylinders, rectangular cells or other configurations practical for a given installation. Further, it is to be understood that any of the described fuels can be used with any of the described anti-fuels in the practice of the present invention.

Various modifications can be made in the invention without departing from the spirit or scope thereof for it is understood that we limit ourselves only as defined in the appended claims.

What is claimed is:

1. A battery for generating electrical energy which comprises a container having anode and cathode compartments, wherein the anode and cathode compartments are separated by a combination of an electrolyte (separator) in the form of a plurality of fine hollow fibers sealed in a common header,
said fibers extending into, but being closed to, the cathode compartment and in open communication with the anode compartment, said electrolyte (separator) being of a material selected from the group consisting of polycrystalline ceramics, amorphous glasses and impregnated matrixes in which have been embedded an essentially non-migrating salt or liquid which is permeable only to the anode metal ion;
said electrolyte (separator) being further characterized as transmitting ions of the alkali metal anode between the anode and cathode compartments of said cell, but being further characterized as substantially not conducting electrons and not transmitting an elemental metal anode, molecular cathode material and the ionic form of said cathode material; and
the anode compartment containing an elemental metal anode in the form of an oxidizable liquid metal selected from the group consisting of alkali metal, alkali metal amalgams, alkali metal alloys and mixtures thereof, and the cathode compartment containing a non-aqueous, liquid reducible cathode material and the anion of said cathode material, said cathode material being a member selected from the group consisting of sulfur, selenium, tellurium, tetracyanoethylene, para-thiocyanogen and ferricyanide.

2. A battery as in claim 1 wherein the hollow fine fibers are made of glass.

3. A battery as in claim 1 wherein the anode and cathode comprise sodium and sulfur respectively.

4. A battery as in claim 1 wherein the anode is an alkali metal.

5. A battery as in claim 1 comprising in addition means each for introducing anode metal into the anode compartment and for withdrawing catholyte from the cathode compartment.

6. A battery as in claim 1 wherein the hollow fine fibers are made of glass and have an outside diameter from about 20 to 1000 microns and a wall thickness from about 5 to 100 microns and are sealed within a common header, which in turn is sealed within a container, to form the anode-cathode compartment partition.

7. A battery as in claim 6 wherein the anode is an alkali metal and the cathode material comprises sulfur.

8. The battery of claim 1 and including in addition electron conducting leads communicating with each of the anode and cathode compartments.

References Cited

UNITED STATES PATENTS

| | | | |
|---|---|---|---|
| 2,081,926 | 6/1937 | Gyuris | 136—83 |
| 2,631,180 | 3/1953 | Robinson | 136—83 |
| 3,000,996 | 9/1961 | Usel | 136—9 |
| 3,031,518 | 4/1962 | Werner et al. | 136—86 |
| 3,404,035 | 10/1968 | Kummer et al. | 136—6 |
| 3,404,036 | 10/1968 | Kummer et al. | 136—6 |
| 3,476,602 | 11/1969 | Brown et al. | 136—6 |

ANTHONY SKAPARS, Primary Examiner

U.S. Cl. X.R.

136—83